United States Patent
Groitzsch et al.

(10) Patent No.: US 7,996,137 B2
(45) Date of Patent: Aug. 9, 2011

(54) METHOD FOR PRODUCTION OF A BRAKE STAND-BY FUNCTION

(75) Inventors: Stephan Groitzsch, Weinheim (DE); Torsten Cress, Schlüchtern (DE)

(73) Assignee: Continental Teves AG & Co., OHG, Frankurt (DE)

( * ) Notice: Subject to any disclaimer, the term of this patent is extended or adjusted under 35 U.S.C. 154(b) by 878 days.

(21) Appl. No.: 11/632,986

(22) PCT Filed: Jul. 8, 2005

(86) PCT No.: PCT/EP2005/053287
§ 371 (c)(1),
(2), (4) Date: Aug. 2, 2007

(87) PCT Pub. No.: WO2006/008248
PCT Pub. Date: Jan. 26, 2006

(65) Prior Publication Data
US 2008/0033622 A1 Feb. 7, 2008

(30) Foreign Application Priority Data
Jul. 21, 2004 (DE) .................... 10 2004 035 378

(51) Int. Cl.
*B60T 7/12* (2006.01)

(52) U.S. Cl. .......... 701/78; 180/179; 180/170; 180/175; 303/135; 701/93; 701/70

(58) Field of Classification Search .................... 701/70, 701/78, 83, 93–98, 110; 303/125, 3, 155, 303/135, 113.4, 113.3, 140, 141, 114.3, 191, 303/193, 199; 180/179; 477/182, 210, 186, 477/154, 108, 144, 94, 119; 192/221; 340/439, 340/463, 576, 479, 468, 466; 188/355–359
See application file for complete search history.

(56) References Cited

U.S. PATENT DOCUMENTS

| | | | | |
|---|---|---|---|---|
| 5,924,508 A | * | 7/1999 | Clauss et al. | 180/179 |
| 6,367,322 B1 | * | 4/2002 | Rump | 303/114.3 |
| 6,554,744 B2 | * | 4/2003 | Schmidt | 477/208 |

FOREIGN PATENT DOCUMENTS

| | | | |
|---|---|---|---|
| DE | 4413172 | | 3/1995 |
| DE | 19629229 | | 1/1998 |
| DE | 19629229 A1 | * | 1/1998 |
| EP | 1424254 | | 6/2004 |
| EP | 1424254 A2 | * | 6/2004 |

\* cited by examiner

*Primary Examiner* — Jack Keith
*Assistant Examiner* — Adam Tissot
(74) *Attorney, Agent, or Firm* — Drinks Hofer Gilson & Lione

(57) ABSTRACT

In a method of changing the trigger threshold of a brake stand-by function of a vehicle brake, the brake stand-by function generates brake pressure in wheel brakes without application of a brake pedal. The trigger threshold value for the brake stand-by function is determined by the following steps:
  a) determining an average return speed of an accelerator pedal;
  b) changing the trigger threshold value for the brake stand-by function depending on the determined average return speed of the accelerator pedal.

The method allows reducing the number of spurious releases of the brake stand-by function, which a sportive driving style brings about.

In another embodiment of the method, the position of the accelerator pedal is used to change the trigger threshold value for the brake stand-by function.

6 Claims, 2 Drawing Sheets

METHOD FOR PRODUCTION OF A BRAKE STAND-BY FUNCTION

BACKGROUND OF THE INVENTION

The present invention relates to a method of changing the trigger threshold of a brake stand-by function of a vehicle brake.

The invention is based on a brake device, which is known by the name 'brake assist system'. The origin of creating the brake assist system is the empiric observation that unskilled drivers do not depress the brake pedal with sufficient vigor in the event of a panic stop in order to achieve the maximum possible brake effect.

The brake assist system provides a remedy in this case upon detection of an emergency braking situation by building up higher brake pressure than would be corresponding to the position of the brake pedal. The graph of FIG. 1 shows this state of affairs.

FIG. 1 depicts three different curves, which display the variation of the brake pressure as a function of time t for three different types of drivers. Curve 1 describes the rise of the brake pressure in a panic stop for an average driver, curve 2 describes it for a skilled driver, and curve 3 for an average driver with a brake assist system.

FIG. 1 illustrates that an average driver manages to build up the maximum brake pressure more quickly with the aid of a brake assist system than without a brake assist system. This means that an average driver having a brake assist system—as can also be seen in FIG. 1—is even able to surpass the braking power of a skilled driver without a brake assist system. The faster pressure increase leads to a shorter stopping distance and, thus, enhances traffic safety.

In an improvement of the brake assist system, brake pressure is built up in the wheel brakes upon detection of an emergency braking situation already before the driver applies the brake pedal. The advantage of this system involves that the brake pads or brake shoes will move to bear against the brake discs or brake drums as a result.

Admittedly, no appreciable braking effect is accomplished by this action, but the response time of the brake is shortened because the clearance of the brake pads or brake shoes is overcome already prior to the application of the brake pedal. This function of the brake assist system is also referred to as brake stand-by function.

A major aspect of the proper functioning of the brake stand-by function is the reliable detection of an emergency braking situation.

In a method disclosed in DE 44 13 172 C2, an exceeding of a threshold value for the actuating speed of the brake pedal indicates that an emergency braking situation prevails. Active braking with maximum brake pressure is performed in response thereto. In this method, the return speed of the accelerator pedal is evaluated in order to adapt the threshold value for the actuating speed of the brake pedal.

In addition, it is known from DE 196 29 229 A1 to produce brake pressure in the wheel brakes in order to eliminate the clearance when the return speed of the accelerator pedal exceeds a predetermined threshold value.

In the prior art methods and devices, however, the difficulty may be encountered that it is impossible to make a reliable distinction between an emergency braking situation and a shifting operation as regards drivers with a sporty driving style who shift the gears quickly. The result may be that a sporty driving style and rapid upshifting maneuvers will trigger the brake stand-by function and insignificant deceleration occurs. However, this is in contradiction to the desire of the sporty driver to achieve maximum high acceleration.

SUMMARY OF THE INVENTION

In view of the above, an object of the invention is to overcome the described difficulty.

This object is achieved by a method of changing the trigger threshold value of a brake stand-by function of a vehicle brake.

According to the invention, a method of changing the trigger threshold value of a brake stand-by function of a vehicle brake is disclosed, and the brake stand-by function generates brake pressure in wheel brakes without application of a brake pedal. The method of the invention is characterized in that a trigger threshold value for the brake stand-by function is determined by the following steps:
- a) determining an average return speed of an accelerator pedal; and
- b) changing the trigger threshold value for the brake stand-by function depending on the determined average return speed of the accelerator pedal.

In an improvement of the invention, the trigger threshold value is increased when the average return speed exceeds a first limit value. In a corresponding manner, the trigger threshold value is decreased when the average speed is lower than a second limit value.

In an alternative embodiment of the invention, the trigger threshold value for the brake stand-by function is determined as a function of the accelerator pedal position. More specifically, the following steps are performed:
- a) repeated measuring of a position value, which corresponds to the position of an accelerator pedal;
- b) comparing a currently measured position value of the accelerator pedal with a previously measured position value;
- c) establishing a defined position value as an accelerator pedal initial value, the establishing operation taking place according to predefined rules, and
- d) changing the trigger threshold value for the brake stand-by function depending on the accelerator pedal initial value.

Suitably, the repeated measurement can be carried out on a regular basis.

In an improvement of the invention, a currently measured position value is established as the accelerator pedal initial value when the currently measured position value exceeds the position value measured shortly beforehand.

In another improvement of the invention, a currently measured position value is established as the accelerator pedal initial value when the currently measured position value exceeds a position value measured two or more measurements before. In a variation of this improvement, it can be provided that the currently measured position value is higher by a predefined difference than a position value measured two or more measurements before in order to be established as the accelerator pedal initial value.

In still another improvement of the invention, a currently measured position value is established as the accelerator pedal initial value if the difference, which the currently measured position value is lower than the position value measured one, two or more measurements before and falls below a predefined threshold value.

Suitably, the accelerator pedal initial value can be reset to a predetermined standard value when the accelerator pedal adopts the neutral position.

The invention will now be explained in detail by way of an embodiment. For better comprehension of the invention, the drawing shows a device for implementing the method of the invention and some essential functional correlations.

DETAILED DESCRIPTION OF THE DRAWINGS

Figure 1:
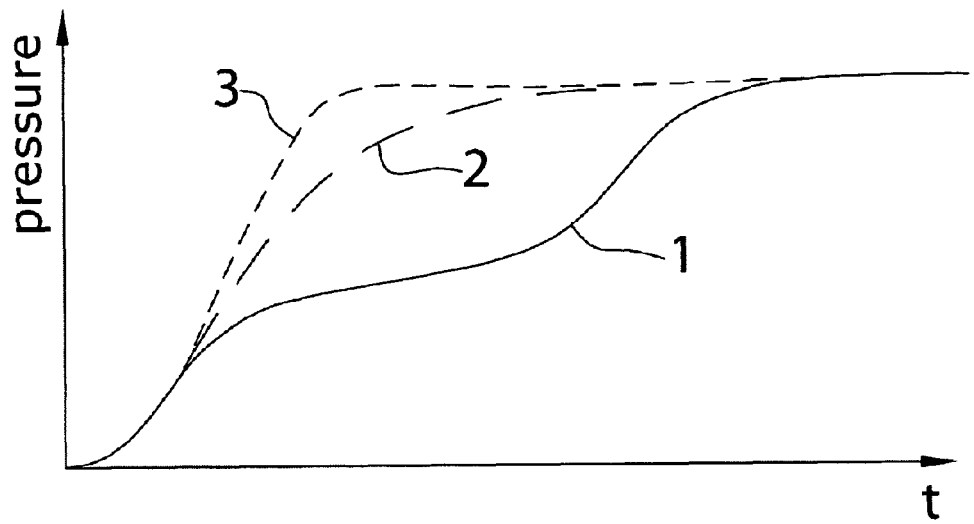
FIG. 1 shows the buildup of the brake pressure as a function of time for different drivers.

FIG. 1 illustrates the influence of a brake assist system on the speed, with which brake pressure is built up in a vehicle brake. This influence has been described already in the introduction.

Figure 2:
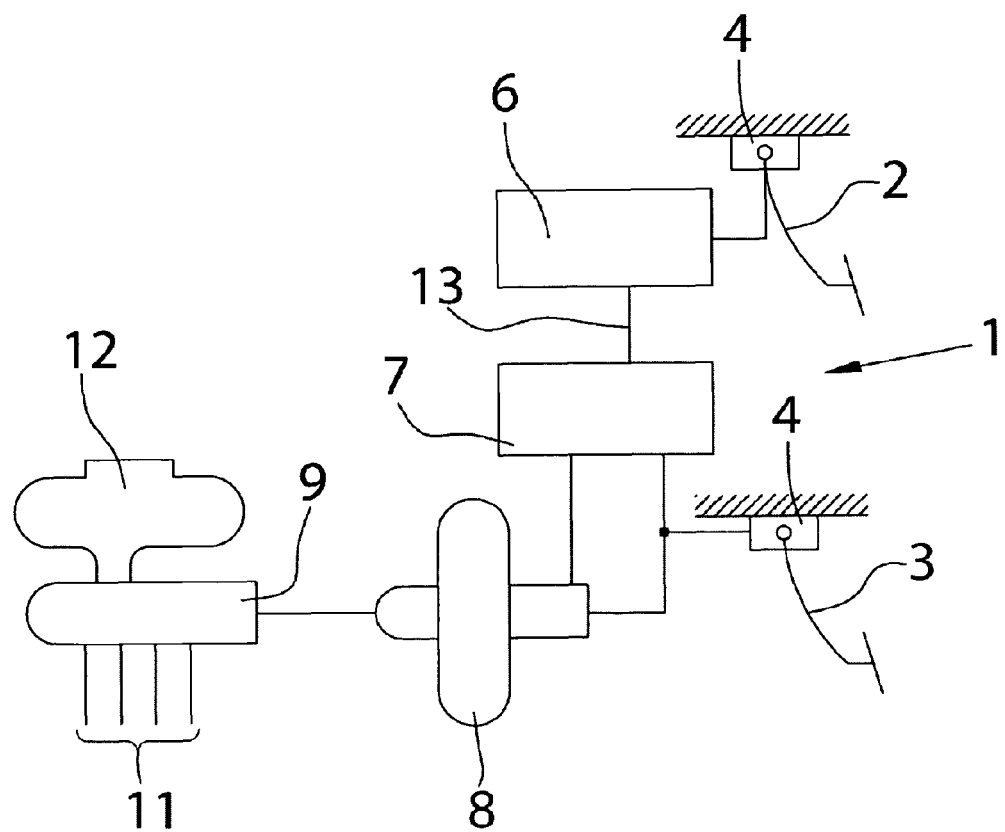
FIG. 2 is a schematic view of a device for implementing the method of the invention.

FIG. 2 shows a device for implementing the method of the invention. Reference numeral 1 is assigned to the device as a whole. The device comprises an accelerator pedal 2 and a brake pedal 3. Associated sensors 4 detect the displacement travels and the displacement speeds of the accelerator pedal 2 and the brake pedal 3. The accelerator pedal 2 is used to generate in an electrical fashion driving commands being read in by an engine control 6, requesting torque from an engine to comply with to the driving commands. An engine control of this type is known in the state of the art e.g. by the name of 'drive-by-wire' and, therefore, will not be described in detail herein.

Braking commands are submitted by means of the brake pedal 3 to an electrohydraulic control unit 7, which takes care of a corresponding brake pressure in the wheel brakes of the vehicle in conformity with the braking commands of the driver. The electrohydraulic control unit 7 is likewise known in the state of the art as a component of so-called 'brake-by-wire' brake systems.

The electrohydraulic unit 7 is in communication with a brake booster 8 by way of signals. In addition, the brake booster is coupled also mechanically to the brake pedal 3. The brake booster 8 transmits a mechanical movement to a master brake cylinder 9, in which hydraulic pressure is generated that is transmitted into the wheel brakes (which are not shown in FIG. 2) by way of brake conduits 11.

In addition, a supply tank 12 for brake fluid is connected to the master brake cylinder 9 in terms of flow. Finally, a signal connection 13 is provided between the engine control 6 and the electrohydraulic unit 7, allowing the transmission of a signal, which serves to determine the brake stand-by function in the electrohydraulic unit 7 and triggers the brake stand-by function. The engine control 6 can determine the brake stand-by function and make it available to the electrohydraulic unit 7.

Like in the prior art devices described hereinabove, the position or the return speed of the accelerator pedal is read in or calculated by the engine control and sent to the electrohydraulic unit 7 likewise in the invention at issue. When the return speed exceeds a predetermined threshold value, the brake stand-by function is triggered, that means, low brake pressure is generated in the wheel brakes in order to eliminate the clearance of brake pads or brake shoes, respectively. The special feature of the invention resides in that the driving behavior of the driver is monitored in order to adapt the trigger threshold value for the brake stand-by function to the driving behavior.

In a first embodiment of the invention, an average value is produced from a defined number of return speeds, which value can be assigned to a certain driving behavior. The average value is then calculated based on a selectable number of return speeds of the accelerator pedal in upshifting operations, i.e. unless a braking intervention by the driver occurs subsequently. The return speeds in this case are evaluated only until a selectable limit position of the accelerator pedal, and the limit position is placed ahead of the neutral position but can also be the neutral position. The bottom threshold value can be adapted to the respective type of vehicle.

A low average return speed corresponds to a rather inert driving behavior, and the trigger threshold value for the brake stand-by function is decreased. A normal driving behavior is deduced from an average return speed, which is higher in comparison thereto, and the trigger threshold value stays on its normal value. A sporty driving behavior is deduced from comparatively higher return speeds, and the trigger threshold value for the brake stand-by function is increased. Finally, a hectic driving behavior prevails at still higher average return speeds, and the trigger threshold value is increased to such an extent that the brake stand-by function is triggered no more.

On the one hand, it is thereby achieved that the brake stand-by function is reliably triggered even in the event of a rather slow driving behavior because the trigger threshold value is decreased. On the other hand, a sporty driving behavior is in no way impaired by the brake stand-by function because the trigger threshold value is increased according to the driving behavior.

The quantitative definitions of the individual parameters naturally depend on the respective type of vehicle, in particular on the issue, which maximum return speed of the accelerator pedal is possible in a vehicle. Appropriate parameters for a defined type of vehicle can then be determined in driving tests.

The electrohydraulic unit 7 takes care of establishing the return speeds of the accelerator pedal and calculating the associated average values in the embodiment at topic. The engine control 6 can directly furnish the return speeds of the accelerator pedal as well. In other embodiments of the invention, these functions can also be performed by other components, in particular by an electronic evaluating unit especially provided for this purpose.

In a second embodiment of the invention, spurious releases of the brake stand-by functions are reduced in a different manner. To this end, the position of the accelerator pedal is measured in regular intervals. This is because empirical studies found out that the speed of release of the accelerator pedal at the end of the release movement is the higher the deeper the accelerator pedal was depressed at the beginning of the release movement.

Therefore, an accelerator pedal initial value $F_{PA}$ describing the accelerator pedal position is determined in this embodiment, which value is taken into account in the determination of the trigger threshold value for the brake stand-by function. The accelerator pedal initial value is the greater the stronger the accelerator pedal was depressed and is detected during each return movement of the accelerator pedal in the direction of the neutral position until behind a selectable limit position. The trigger threshold value is defined to the effect that it is the higher the greater the accelerator pedal initial value is.

This means practically that a release speed of the accelerator pedal is possible without triggering the brake stand-by function, which is the higher the deeper the accelerator pedal was depressed at the commencement of the release movement. This feature complies with the wishes of a sporty driver, who is allowed to accelerate fast and shift quickly when using the invention, without triggering of the brake stand-by function.

Figure 3A:
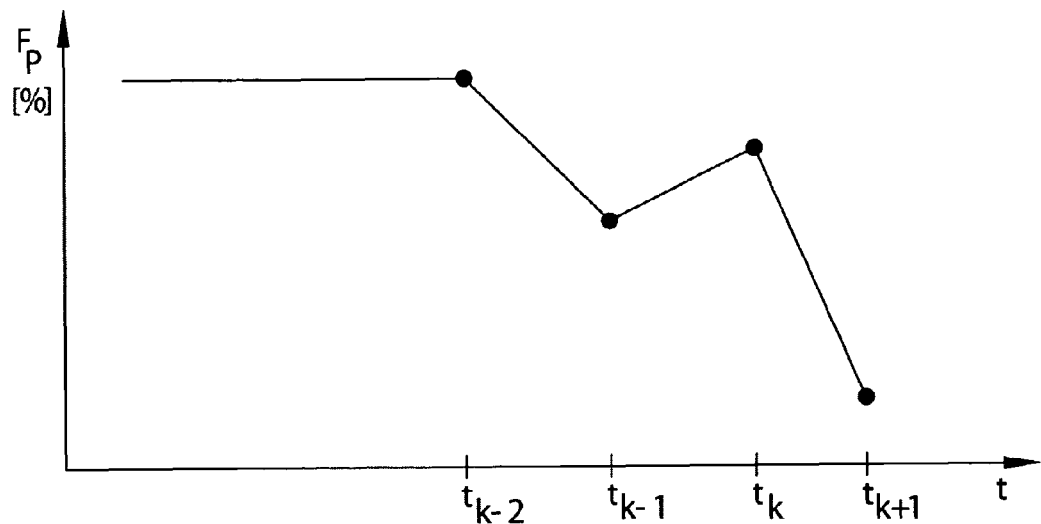
FIG. 3a shows a curve illustrating the change of the position of an accelerator pedal with time, and FIG. 3b likewise shows a curve illustrating the change of the position of an accelerator pedal with time.
Figure 3B:
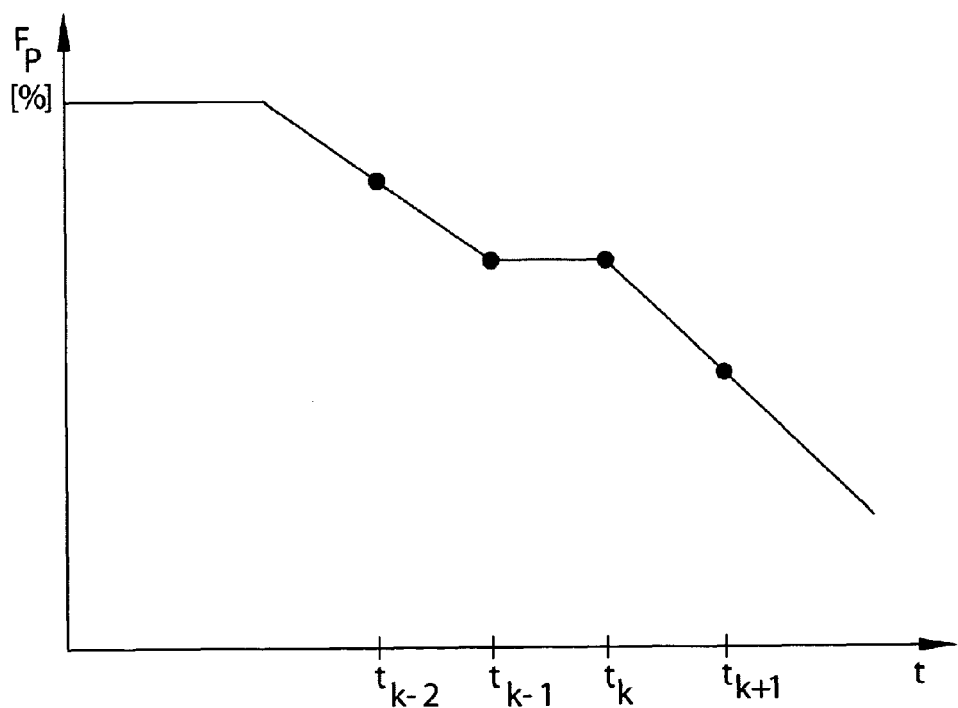

The invention discloses two different possibilities of establishing the accelerator pedal initial value $F_{PA}$, which are described by way of FIGS. 3a and 3b.

The position of the accelerator pedal $F_P$ is plotted as a function of time t in FIGS. 3a and 3b. The meaning of the diagrams is such that a position value is associated with and corresponds to the position of the accelerator pedal. For the sake of clarity, however, only the position of the accelerator pedal will be referred to in the following, although of course numerical values are measured and compared. The position of the accelerator pedal is plotted on the ordinate in percent, and 100% means full throttle. The position of the accelerator pedal is detected in regular intervals. The moments $t_k$, at which the accelerator pedal position is measured, are plotted on the abscissa t, and k is an index.

In connection with FIG. 3a, at a moment $t_k$, the accelerator pedal position $F_P(t_k)$ is always compared with the directly preceding position $F_P(t_{k-1})$ at the time $t_{k-1}$. When $$F_P(t_k) > F_P(t_{k-1})$$

is applicable, the value $F_P(t_k)$ is saved as the accelerator pedal initial value $F_{PA}$. This means that in practical operations always the deepest accelerator pedal position is referred to. When the accelerator pedal reaches the neutral position, the accelerator pedal initial value is reset to a standard value so that the accelerator pedal initial value $F_{PA}$ is determined anew with each return movement of the accelerator pedal.

FIG. 3b depicts another change of the accelerator pedal position with time, and another possibility of defining the accelerator pedal initial position will be explained based on this change. In contrast to the curve illustrated in FIG. 3a, the accelerator pedal, after an initial release movement, is maintained constant during a period between the times $t_{k-1}$ and $t_k$ in this case. In the present embodiment, one is looking further in the past (when being descriptive) in the establishment of the accelerator pedal initial value because the current accelerator pedal position $F_P(t_k)$ is compared with the last but one measurement of the accelerator pedal position $F_P(t_{k-2})$. When $$F_P(t_k) > F_P(t_{k-2}) - x$$

is applicable, the value $F_P(t_k)$ is saved as the accelerator pedal initial value $F_{PA}$. In this respect, the value x reflects a free parameter, which can be adapted to different types of vehicles. The value x may e.g. correspond to 1% of the full throttle position of the accelerator pedal.

This method of determining the accelerator pedal initial value is favorable when a driver moves the accelerator pedal in a varying manner. In this case, too, the accelerator pedal initial value is reset to a standard value, when the accelerator pedal reaches the neutral position, so that the accelerator pedal initial value is re-determined with each return movement of the accelerator pedal.

It is also possible in a particularly advantageous manner to combine both methods shown. In this case, it is permanently monitored whether one of the two conditions shown is satisfied. If this is the case for one condition, the accelerator pedal initial position is adapted accordingly.

The invention claimed is:

1. A method of changing a trigger threshold of a brake stand-by function of a vehicle brake, with the brake stand-by function generating brake pressure in wheel brakes without application of a brake pedal, wherein a trigger threshold value for the brake stand-by function is determined by the following steps performed by an electronic control unit:
    setting an accelerator pedal initial value to a standard value;
    detecting that an accelerator pedal has been moved from a neutral position to an actuated position;
    repeatedly making a measurement of a position value, which corresponds to the position of the accelerator pedal;
    comparing a new measurement of the position value of the accelerator pedal with a previous measurement position value;
    determining that the new measurement represents a greater displacement from the neutral position than the previous measurement;
    replacing the accelerator pedal initial value with a new accelerator pedal initial value that corresponds to the new measurement;
    changing the trigger threshold value for the brake stand-by function depending on the new accelerator pedal initial value (FpA), wherein the trigger threshold value is in positive correlation with the displacement represented by the new accelerator pedal initial value; and
    initiating an application of brake pressure in the wheel brakes when the trigger threshold value is exceeded.

2. The method as claimed in claim 1, wherein the new measurement of the position value is established as the new accelerator pedal initial value (FpA) when the new measurement of the position value represents a displacement that is greater than the displacement represented by the immediately preceding measurement of the position value.

3. The method as claimed in claim 1, wherein the new measurement of the position value is established as the new accelerator pedal initial value (FpA) when the new measurement of the position value represents a displacement that is greater than the displacement represented by a measurement of the immediately preceding measurement of the position value measured two or more measurements before.

4. The method as claimed in claim 1, wherein the new measurement of the position value is established as the new accelerator pedal initial value (FpA) when the new measurement of the position value represents a greater displacement by at least a predefined difference (x) than a measurement of the position value measured two or more measurements before.

5. The method as claimed in claim 1,
    wherein the accelerator pedal initial value ($F_{PA}$) is reset to the standard value when the accelerator pedal (2) adopts the neutral position.

6. The method as claimed in claim 1, wherein the accelerator pedal initial value (FpA) is replaced with the new accelerator pedal parameter that corresponds to the new measurement of the position value representing a smaller displacement than the previous measurement of the position value by a difference that does not exceed a predetermined amount.

* * * * *